Aug. 2, 1960     E. SCHASCHL ET AL     2,947,679
CORROSION RATE SENSING ASSEMBLY

Filed Dec. 24, 1956     2 Sheets-Sheet 1

INVENTORS
EDWARD SCHASCHL
BY GLENN A. MARSH

*Edward H. Young*
ATTORNEY

Aug. 2, 1960

E. SCHASCHL ET AL 2,947,679

CORROSION RATE SENSING ASSEMBLY

Filed Dec. 24, 1956

INVENTORS
EDWARD SCHASCHL
GLENN A. MARSH
BY
Edward D. Lung
ATTORNEY

United States Patent Office 2,947,679
Patented Aug. 2, 1960

2,947,679

CORROSION RATE SENSING ASSEMBLY

Edward Schaschl and Glenn A. Marsh, Crystal Lake, Ill., assignors to The Pure Oil Company, Chicago, Ill., a corporation of Ohio Filed Dec. 24, 1956, Ser. No. 630,309

8 Claims. (Cl. 204—195)

This invention is concerned with facilitating corrosion investigations. It more specifically relates to the determination of corrosion rate of iron or steel in neutral environments such as water or solids.

Corrosion is a matter of serious consequence in the design and operation of industrial apparatus, and its control warrants close attention. Because corrosion mechanisms are complex in nature, it is desirable that the corrosion rate of a metal being considered be determined under the actual conditions to which it is to be exposed in service. In many instances, a knowledge of the corrosion characteristics of various alternative materials of construction is of considerable benefit during the design of equipment. Unfortunately, relatively long periods of time are required to obtain directly measurable results on exposed specimens and provide data which are extensive enough to be meaningful. Accelerating the corrosion mechanism does not provide satisfactory correlation. It is therefore the trend in corrosion studies to measure corrosion rates by indirect or analogue methods, employing apparatus of sufficient sensitivity to measure corrosion in terms of physical phenomena which are correlatable to the corrosion process.

Of the so-called common metals, carbon steels, or other similar steels, containing more than about 98% iron, are the most extensively used materials of construction. Because of their low cost, these materials find application in a variety of services in which they are exposed to corrosive environments. Since corrosion resistance is not a characteristic of these steels, it is necessary to detect and follow the course of corrosion under a variety of conditions, in order that suitable protective steps may be taken when required.

It is therefore a primary object of this invention to provide a method and apparatus for measuring the corrosion rate of carbon steels or the like which are exposed to aqueous systems. It is another object of this invention to facilitate the measurement of corrosion rates of carbon steels or the like which are corroding in an aqueous environment having a pH of 5.5 or greater. An additional object of this invention is to provide a method and apparatus for determining the amount of current density required for cathodic protection of the steel being investigated whereby the corrosion rate of the steel can be measured. These and other objects will be made more apparent from the following detailed description of the instant invention.

Figure 1:
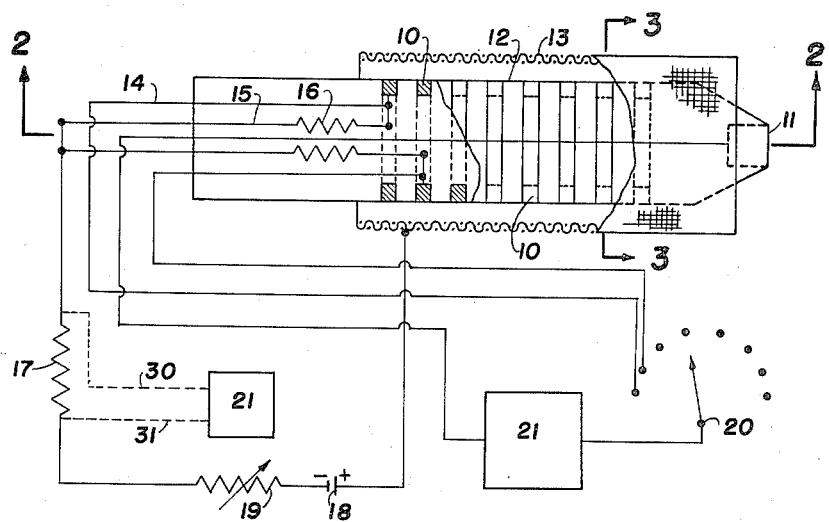
Figure 1 is a diagrammatic arrangement of an apparatus employed in the instant invention.

As steel corrodes in an aqueous solution of approximately neutral pH, the following process occurs at the anodic areas:

$$Fe \rightarrow Fe^{++} + 2e$$

and a current flows as a result of the oxidation of the iron. This anodic current, best referred to in terms of current per unit area of surface, will hereinafter be designated as corrosion current. In terms of corrosion current density, $I_u$, it is the amount of current flowing from a steel surface of unit area corroding at a rate of one unit of thickness per unit of time. Although a variety of units can be used to express this value, convenient dimensions are milliamperes/square foot/microinch/hour. For example, if one square foot of steel surface is corroding at a rate of one microinch per hour, the corrosion current is 17.8 milliamperes, as determined by Faraday's law. In this instance, corrosion current density, $I_u$, is 17.8 milliamperes/square foot/microinch/hour.

This corrosion can be overcome by cathodic protection, in which instance the entire structure to be protected is made cathodic by impressing an electrical potential on it in such a way as to make it cathodic with respect to the surrounding corrosive atmosphere. In order for all parts of the metal structure to be made cathodic, the applied voltage must be great enough to cause a certain amount of current to flow into the protected metal surface. The amount of current required to achieve this state of protection, related to the area of the surface protected, is called the minimum current density. Generally, this minimum current density is approximately equal to the corrosion current density, and, in solutions having a pH greater than about 5.5, is about 20% greater than the corrosion current density. Since minimum current density and corrosion current density are thus related, and since corrosion current density and corrosion rate are also related, determination of the minimum current density in a corrosion system permits numerical definition of the corrosion rate. These relationships can be mathematically expressed as follows:

(1) $$U = \frac{I_p}{KI_u}$$

where $U$=corrosion rate of unprotected metal (when $I_p = KI_u$, $U=1$ microinch/hour)
$I_p$=minimum current density
$I_u$=corrosion current density
$K$=the constant 1.2 for steel in aqueous solutions of pH 5.5–8.0

The purpose of cathodic protection is to prevent corrosion by making all points on the surface of the metal cathodic with respect to the corrosive surroundings. Protection has been found, and often reported, to be attained when the potential of the structure to be protected versus that of a reference electrode is lowered by about 0.3 volt. Accordingly, when the potential difference of the cell formed by the steel structure and the selected reference electrode has been lowered 0.3 volt, the minimum current density has been reached. According to this invention, a rapid determination of corrosion rate can be obtained for plain carbon steels, or other similar steels, which are exposed to aqueous environments having a pH greater than about 5.5, by applying an increasing current to a steel structure being investigated until its electrode potential indicates that minimum current for cathodic protection has been obtained. The applied current is noted and converted to corrosion rate by use of the foregoing relationship.

In Figure 1, wherein one embodiment is schematically depicted, there is shown a plurality of test specimens 10, in the form of steel rings, and a reference electrode 11, mounted and a cylindrical base element 12 which is fabricated from an electrical insulating material. Surrounding base element 12 is cylindrical, screen anode 13. Electrical lead wires 14 are connected directly to each specimen and lead wires 15 are connected to each specimen through fixed resistances 16. For simplicity, lead wires are shown connected to only two specimens. The opposite terminals of lead wires 15 are connected to common fixed resistance 17 which in turn is joined to power source 18 through rheostat 19. Fixed resistances 16 each impose a different resistance in lead wires 15, thereby dividing the total current flowing from fixed resistance 17 such that different current densities are maintained on each specimen. Lead wires 14 are connected to separate contact points on selector switch 20, the common terminal of which is connected to one side of volt meter 21. Reference electrode 11 is electrically connected to the other side of voltmeter 21 which is preferably of the vacuum tube type. Anode 13 is electrically joined to the positive side of power source 18.

The sensing element assembly, comprising the test specimens, reference electrode and anode, is inserted into the solution to be studied such that all specimens and the reference electrode are completely submerged, and power is turned on. At the beginning of the test period, voltmeter 21 is temporarily connected across fixed resistance 17 as indicated by broken lines 30 and 31. The IR drop through fixed resistance 17 is noted on volt meter 21 and is adjusted by means of rheostat 19 to an arbitrary value. This in effect, standardizes the current density that is being applied to each test specimen 10.

After the correct IR drop has been established, voltmeter 21 is connected in series between reference electrode 11 and selector switch 20, and the system is allowed to come to equilibrium. The time required to attain equilibrium is dependent on the particular environment under study, viz., where quiescent baths of solutions having relatively low conductivities are being studied, only a few minutes will generally be required but high conductivity solutions under violent agitation may require the allowance of several hours. After equilibrium has become established, the test specimens are connected in turn to voltmeter 21 by means of selector switch 20, and the potential difference between each test specimen and the reference electrode is noted until potential difference between one of the test specimns and the reference electrode has been lowered −0.3 volt. A posteriori, this test specimen is at the minimum current density condition.

The resistance value of fixed resistance 17, and the IR drop through it, are known. Accordingly, the total current flowing can be calculated or read from a suitably prepared chart, table, or graph. Fixed resistances 16, and the ratio in which they divide the total current are also known, and, since the area of each specimen is known, the current density on each specimen can be calculated or determined by reference to pre-prepared tables or graphs.

In the alternative, the circuitry used in combination with the apparatus and process of this invention can be arranged in order to measure the current flowing to each specimen 10 rather than measuring the total current. In most instances this is preferred because the amount of current flowing to each individual specimen is dependent on the resistance of the lead plus the resistance of the electrolytic process at the cathode. Accordingly, in many cases the distribution of the total current may not be the same as expected from consideration of only the lead resistance. An example of this type of cooperating electrical circuits is shown in the specific embodiment illustrated in Figure 6. The sensing element consists of carbon rod 80 as the anode which is ensheathed in a plastic coating 81 having imbedded therein mild steel rings 82. Calomel half-cell 83 is employed as the reference electrode.

Six-volt battery 84 is used as the source of D.C. current. The positive side is connected directly to carbon anode 80. The negative side is connected to rheostat 85. The current separates into leads 86a, b, c, d, e, going to each steel specimen 82. Resistances 87a, b, c, d, e, of different values are included in each lead and taps on both sides of the resistances are provided.

Multi-contact switch 88 is provided to make connection at both ends of each resistance. Switch 89 connects the vacuum tube volt meter to either the common junction of resistances 87a to e or to calomel half-cell 83. In the position shown, the vacuum voltmeter measures the potential drop across the resistance for calculating the current. In the other position, the vacuum-tube voltmeter measures the potential of each specimen versus the calomel half cell.

With this arrangement the open circuit potential of the steel vs. a calomel half-cell is about −0.48. The point of minimum current density for cathodic protection would then be −0.78 volt versus a calomel half-cell.

The probe is inserted into the corroding environment and rheostat 85 is adjusted so that specimen 82a has a potential of about −0.85 volt. In the case of specimen 82a there would be more current than necessary for protection. However, each of the other specimens would have less current due to the higher values of resistance. At one of these specimens a potential of −0.78 volt exists and that specimen has the proper minimum current density for cathodic protection.

Employing a solution of 3% NaCl in distilled water with pH=7.0 which had been aerated and is air saturated but stagnant (i.e., no agitation), the probe is inserted. The circuit is adjusted so that the potential versus a calomel half-cell of specimen 82a as measured by a vacuum-type voltmeter equals −0.85 volt. The system is allowed to come to equilibrium. With switch 89 still connected for measuring potentials of the specimens versus the reference cell, switch 88 is moved to the position which will give a reading of −0.78 on the vacuum-tube voltmeter. This condition exists at specimen 82b as is seen by the data shown in Table I.

Table I

| Specimen | Potential vs. Calomel half-cell, volts | Potential drop across resistance, volts | Current flowing, ma./ft.$^2$ |
|---|---|---|---|
| 82a | −0.85 | 1.30 | 55 |
| 82b | −0.78 | 1.35 | 43 |
| 82c | −0.75 | 1.30 | 28 |
| 82d | −0.72 | 1.20 | 13 |
| 82e | −0.67 | 1.00 | 2 |

With switch 88 still in position (the point where the potential is −0.78 volt) switch 89 is changed to read potential drop. This value is 1.35 volts and is equivalent to 43 ma./ft.$^2$. If desired the meter can have a scale reading corrosion rate directly.

Calculating the corrosion rate for the above reading:

$$U = \frac{I_p}{KI_u} = \frac{43}{1.2 \times 17.8} = 2.0 \text{ microinches/hour}$$

This value is the proper corrosion rate under these conditions. The current density on the specimen that is at a potential of 0.3 volt less than the potential of the reference electrode is the minimum current density.

Referring back to Equation 1 it can be seen that corrosion rate of the unprotected carbon steel or other similar steel in the particular corrosive environment under study may now be calculated, since K and $I_u$ are constant and known for these materials. Thus, if the minimum current density in a system wherein steel is immersed in dilute brine solution is 30 milliamperes/square foot, corrosion rate of the unprotected steel will be 30/1.2×17.8, or 1.40 micro-inches/hour.

As further refinements of our apparatus, the need for reference to previously prepared tables and graphs, and for calculation, may be eliminated by suiitably modifying the circuitry such that direct-reading dials may be included at proper locations in the circuit. For example, the index marks on switch 20 may be numbered in terms of current density or corrosion rate. Thus, manipulating switch 20 until voltmeter 21 registers a desired value, e.g., —0.3 volt, automatically registers the unprotected corrosion rate on switch 20.

The method and apparatus are useful in determining corrosion rates in any aqueous system having a pH greater than about 5.5; however, it is more desirable to employ this invention where the pH of the corrosive environment is about 7.0. Such systems include, but are not limited to, water, dilute aqueous solutions, water-containing fluids produced from oil wells, soils, and others. It is evident that the specific apparatus employed in carrying out the method of this invention is only illustrative, and modifications can be made therein without departing from the scope of this invention. For example, the steel test specimens can take other forms than the ring structures used in the illustrative example, such as coupons in the form of rectangular or other geometrical configurations. To facilitate the correlation of results, it is preferred that the specimens be substantially the same size; however, specimens of varying size can be used if desired. The size of these elements is related to the range of current densities employed. Generally, specimens having an area of $\frac{1}{16}$ to 1 square inch, using an applied current density of 0.1 to 5.0 milliamperes per square foot, will provide satisfactory results. While these ranges are preferred, it is apparent that other values less than or greater than these ranges can be used where the corrosion rate to be measured is extremely small or large. As pointed out above, selection of a suitable reference electrode can be made from a variety of alternatives. If a sensing element such as is shown in the illustrative figures is employed, it is preferred that the reference electrode be of a type that can be incorporated and integrated into the sensing element design, such as steel, or zinc. On the other hand, if the nature of the corrosive system being scrutinized permits, a plurality of test specimens can be immersed therein and a standard reference electrode such as a calomel, $Cu$—$CuSO_4$, $Ag$—$AgCl$, hydrogen, quinhydrone or other similar type of measuring electrode can be used. While the solid metal reference electrodes are preferred for field work where ruggedness and ease of installation are important, the latter electrodes are useful in laboratory investigations or in the study of other systems such as large storage tanks or vessels where installation space is not a limiting factor.

Figure 6:
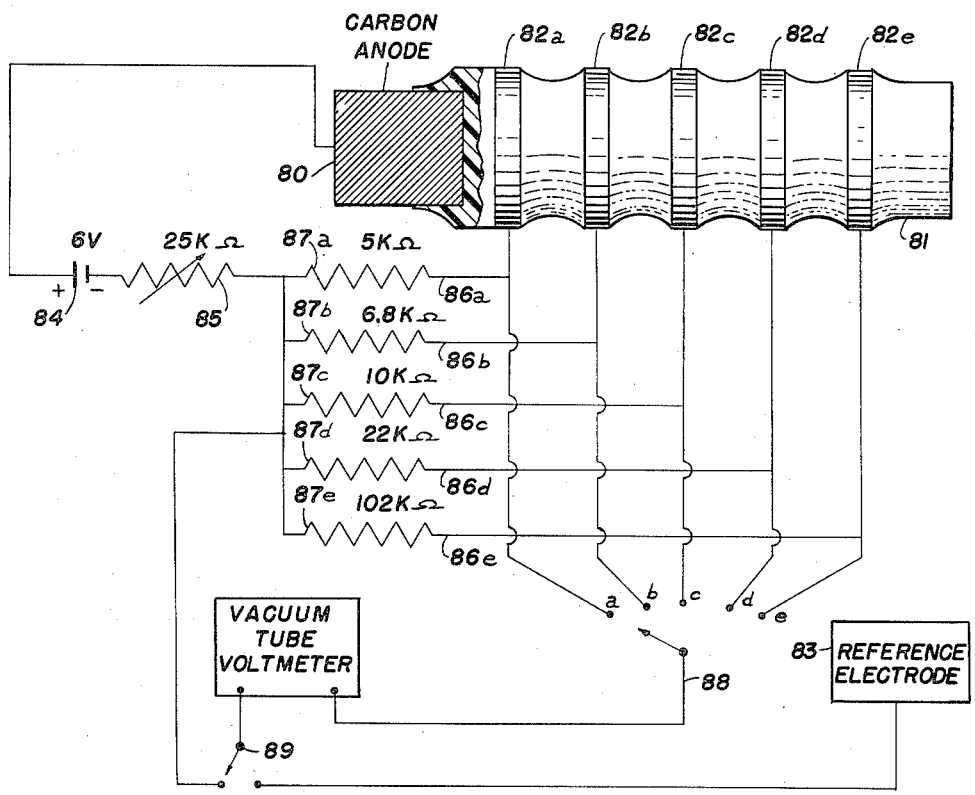
Figure 6 is a schematic diagram of an additional embodiment of this invention employing an alternative electrical measuring network.

The anode employed in the test apparatus is constructed from any electrically conductive material, preferably one which is corrosion resistant to the environment in which the corrosion study is being made and whose ions will not affect the corrosion of the steel specimens. The anode is mounted in relation to the test specimens in such a manner that the internal resistance of the aqueous system, in which the test apparatus assembly is installed, is substantially the same between each specimen and the common anode. Materials such as platinum, gold, high-silicon iron, mild steel, carbon, etc., can be used. It will be noted that the sensing element illustrated in Figure 2 employs a tubular screen, surrounding the base element upon which are mounted the test specimens and the reference electrode. This is a preferred arrangement because intimate contact between the corrosive environment and the sensing element can be maintained. Other structural anode arrangements, however, such as electrically-conductive rods, sheets, etc., can be used, such as shown in Figure 6.

Figure 4:
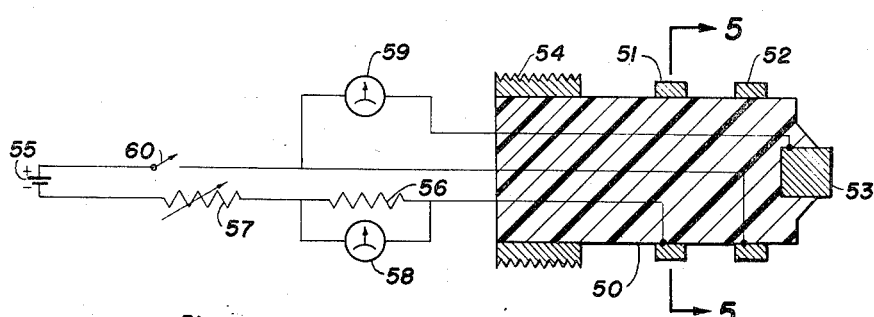
Figure 4 is another embodiment of the sensing element of the instant invention.
Figure 5:
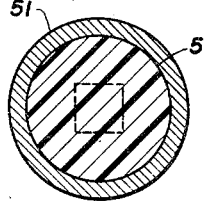
Figure 5 is a cross-sectional view of the sensing element shown in Figure 4, along line 5—5.

Flexibility in sensing element design is shown by the alternative embodiment of the apparatus of this invention illustrated in Figure 4. In this apparatus, rod 50, which is electrically non-conductive, supports corroding test specimen 51 and carbon anode 52, and also reference electrode 53 which may be any suitable reference electrode ($Cu$—$CuSO_4$, calomel, zinc, iron, etc.). The plastic base member can be threaded or imbedded in a pipe plug 54 to facilitate insertion into a vessel or pipe. Battery 55 supplies current to electrodes 51 and 52. Resistor 56 provides a means for determining the current density on electrode 51, using vacuum tube volt meter 58. The current density can be adjusted using rheostat 57. The electrode potential between electrode 51 and the reference electrode 53 is measured on meter 59.

In use, the assembly is inserted into the vessel to be studied. Rheostat 57 is set at maximum resistance. Switch 60 is closed. After a period of time, depending on how fast electrode potential equilibrium is achieved, rheostat 57 is adjusted to increase the amount of current flowing through electrode 51. Meter 59 is used to indicate the extent to which rheostat 57 has to be adjusted. The criterion, for example, if reference electrode 53 is steel, is —0.3 volt. When meter 59 reads —0.3 volt, the current through electrode 51 is sufficient for protection. This current, or current density, is read on meter 58.

Figure 2:
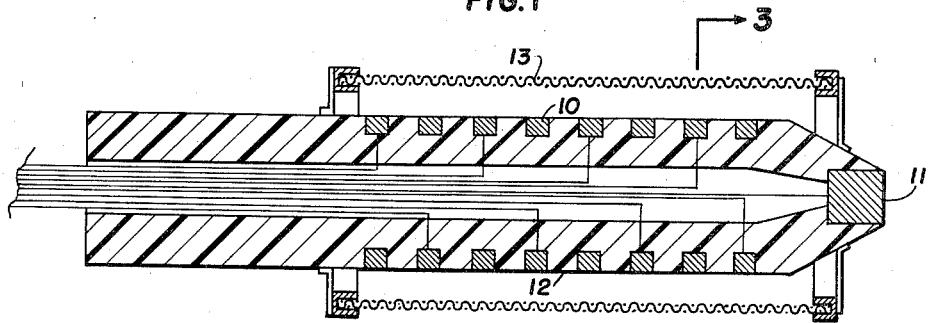
Figure 2 is a cross-sectional view of the sensing element shown in Figure 1, taken along line 2—2.
Figure 3:
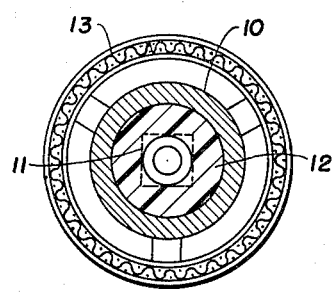
Figure 3 is a cross-section view of the sensing element shown in Figure 1 along line 3—3.

In actual practice, meter 58 and meter 59 may be the same instrument with provision to switch from function 59 to function 58. The meter dial, when in function 58, is calibrated in terms of corrosion rate rather than current density. Thus, this apparatus provides a direct reading corrosion rate meter.

Where electrode polarization is rapidly stabilized, the apparatus illustrated in Figure 4 is preferred. Where use is possible, the device of Figure 4 is preferred because it is simpler to make than that of Figure 2. However, where polarization is slow, the device of Figure 2 or 6 is needed.

The circuitry employed in measuring the potential between the test specimen and the reference electrode is any conventional high resistance voltmeter circuit having sufficient sensitivity to measure the small changes in potential difference produced by the test apparatus without causing appreciable current to flow in the reference electrode. A vacuum-tube voltmeter is satisfactory.

From the foregoing, it is seen that the instant invention provides a means for rapidly determining the corrosion rate of plain carbon steel or other, similar, steel compositions. Modes for applying the principles of this invention other than those specifically mentioned will be obvious to those skilled in the art and can be utilized without departing from the scope of this invention which is defined by the appended claims.

We claim:

1. A sensing assembly for use in determining the corrosion rate of iron which comprises an electrically non-conductive base element, an iron cathode member of known area mounted on said base, a corrosion-resistant anode member mounted on said base in spaced relation from said cathode, a reference electrode incorporated in said base element, means for electrically connecting said cathode and anode members in a direct current power circuit, means for electrically connecting said reference electrode and said cathode member to an electric potential-measuring means, and a threaded element on said base to mount said apparatus in a threaded opening.

2. An assembly in accordance with claim 1 in which said anode member is spaced equidistant from said cathode and said reference electrode.

3. A sensing assembly for rapidly determining the corrosion rate of iron immersed in an aqueous, corrosive environment having a pH in excess of about 5.5, comprising a central non-conducting core, a plurality of tubular, spaced steel cathode members of equal area peripherally mounted on said core, an anode member and a reference electrode mounted on said core, means for electrically connecting said cathode and anode members into a direct current power circuit, and means for electrically connecting said reference electrode to each of said cathode members, individually, in series with a voltmeter whereby the potential difference between said cathode member and said reference electrode can be measured.

4. An assembly in accordance with claim 3 in which said anode member is equidistant from said cathode members.

5. An assembly in accordance with claim 4 in which said anode is a cylindrical screen mounted on said core surrounding said cathode members.

6. An apparatus for rapidly determining the corrosion rate of iron immersed in an aqueous, corrosive environment having a pH in excess of about 5.5, which comprises an electrically non-conductive, cylindrical-shaped, central core, a plurality of spaced, tubular, steel cathode members concentrically mounted on said core, each of said cathodes being substantially identical, a perforate, tubular anode member mounted on said base element surrounding said cathode members and in spaced relationship therefrom, a reference electrode terminally mounted on said core, means for electrically connecting said cathode members and said anode member in parallel circuits to a common source of D.C. power, separate and different electrical resistances serially connected in each circuit, whereby different amounts of power can be applied to each of said cathode members, means electrically connecting each of said cathode members to said reference electrode, said means including a multipoint electrical selector switch means, and a potential-measuring means electrically connected between said switch and reference electrode, whereby the potential difference between each of said cathode members and said reference electrode can be determined.

7. An apparatus in accordance with claim 6 in which said reference electrode is steel.

8. An apparatus in accordance with claim 6 in which the anode is carbon.

References Cited in the file of this patent
UNITED STATES PATENTS

| | | |
|---|---|---|
| 1,865,004 | Haring | June 28, 1932 |
| 2,215,213 | Ellis | Sept. 7, 1940 |
| 2,531,747 | Stearn | Nov. 28, 1950 |
| 2,643,223 | Notvest | June 23, 1953 |
| 2,759,887 | Miles | Aug. 21, 1956 |
| 2,803,797 | Cowles | Aug. 20, 1957 |

FOREIGN PATENTS

| | | |
|---|---|---|
| 203,933 | Australia | Nov. 1, 1956 |

OTHER REFERENCES

Evans: Metallic Corrosion Passivity and Protection, Edward Arnold & Co., 1948, page 507.

Werner: Corrosion, May 1957, pp. 68–74.

Corfield: Gas, November 1944, p. 51.

Logan et al.: The Petroleum Engineer, Reference Annual, 1943, pp. 168–180.

Brown et al.: J. Eletcro Chem. Soc., vol. 81; 1942, pp. 455, 457 and 460–479.

Brown et al.: J. Electro-Chem. Soc., vol. 81, pp. 455–481.

Doklady: Compte Rendus, de l'Academie des Science de l'URSS, 1941, vol. XXXII, No. 3.

Logan et al.: Gas, November 1944, page 51.

Schaschl et al.: Corrosion, Natl. Assoc. of Corrosion Engineers, vol. 13, April 1957, pp. 35–43 and 243t–251t.